US012559140B2

(12) United States Patent
Wylie

(10) Patent No.: US 12,559,140 B2
(45) Date of Patent: Feb. 24, 2026

(54) AUTOMOTIVE MOTION CONTROL SYSTEM AND AUTOMOTIVE ACTUATOR

(71) Applicant: Astemo Netherlands B.V., Zaltbommel (NL)

(72) Inventor: Paul Wylie, Zaltbommel (NL)

(73) Assignee: Astemo Netherlands B.V., Zaltbommel (NL)

( * ) Notice: Subject to any disclaimer, the term of this patent is extended or adjusted under 35 U.S.C. 154(b) by 178 days.

(21) Appl. No.: 18/546,487

(22) PCT Filed: Feb. 14, 2022

(86) PCT No.: PCT/NL2022/050073
§ 371 (c)(1),
(2) Date: Aug. 15, 2023

(87) PCT Pub. No.: WO2022/173303
PCT Pub. Date: Aug. 18, 2022

(65) Prior Publication Data
US 2024/0092396 A1　　Mar. 21, 2024

(30) Foreign Application Priority Data
Feb. 15, 2021　(EP) ..................................... 21157182

(51) Int. Cl.
*B60W 60/00*　　(2020.01)
*B60W 40/10*　　(2012.01)
*G07C 5/00*　　(2006.01)
(52) U.S. Cl.
CPC ........ *B60W 60/0018* (2020.02); *B60W 40/10* (2013.01); *G07C 5/008* (2013.01)
(58) Field of Classification Search
CPC ... B60W 60/0018; B60W 40/10; B60T 8/885; B60T 2270/406; B60T 2270/413;
(Continued)

(56) References Cited

U.S. PATENT DOCUMENTS 5,752,748 A * 5/1998 Schramm ................ B60T 8/885
303/20
6,345,225 B1 2/2002 Bohm et al.
(Continued)

FOREIGN PATENT DOCUMENTS

CN 102887123 A * 1/2013
CN 108422994 A * 8/2018 ............ B60W 30/14
(Continued)

OTHER PUBLICATIONS

International Search Report issued in PCT/NL2022/050073; mailed Jun. 17, 2022.

*Primary Examiner* — Mary Cheung
(74) *Attorney, Agent, or Firm* — Studebaker Brackett PLLC

(57) ABSTRACT

A vehicle motion control system (100, 200) for controlling motion of a vehicle comprises for each wheel (20a,20b,20c, 20d) of the vehicle, a respective motion control actuator (10a,10b,10c,10d) configured to control a motion of the wheel based on a respective actuator control signal (Sa,Sb, Sc,Sd) received by the respective motion control actuators; a central controller (50) configured to control the motion of the vehicle by sending the respective actuator control signal (Sa) to the respective motion control actuator (10a,10b,10c, 10d) of each wheel (20a,20b,20c,20d) based on a motion control intent signal (Si) received by the central controller (50). The vehicle motion control system is configured to determine whether the central controller (50) is functional to send the actuator control signals, and if it is determined that the central controller (50) is not functional, at least one (10a) of the motion control actuators is configured to control a motion of its own wheel (20a) based directly on the motion control intent signal (Si), and to send respective actuator control signals (Sb,Sc,Sd) to other motion control actuators
(Continued)

(10*b*,10*c*,10*d*) of each other wheels (20*b*,20*c*,20*d*) of the vehicle, based on the motion control intent signal (Si).

20 Claims, 4 Drawing Sheets

(58) Field of Classification Search
CPC ... B60T 8/172; B60T 8/32; B60T 8/92; B60T 8/88; G07C 5/008
See application file for complete search history.

(56) References Cited

U.S. PATENT DOCUMENTS

| | | | | |
|---|---|---|---|---|
| 2006/0015231 A1* | 1/2006 | Yoshimura | ........... | B60L 3/0076 |
| | | | | 701/1 |
| 2016/0311419 A1* | 10/2016 | Joyce | ................... | B60T 17/221 |
| 2019/0168724 A1* | 6/2019 | VandenBerg, III | ..... | B60T 8/171 |

FOREIGN PATENT DOCUMENTS

| | | | | | |
|---|---|---|---|---|---|
| DE | 43 39 570 A1 | 5/1995 | | | |
| EP | 4032763 A1 * | 7/2022 | ........... | B60T 13/741 | |
| WO | 99/26822 A1 | 6/1999 | | | |

\* cited by examiner

AUTOMOTIVE MOTION CONTROL SYSTEM AND AUTOMOTIVE ACTUATOR

TECHNICAL FIELD AND BACKGROUND

The present disclosure relates to an electric automotive motion control system.

The present disclosure relates to an automotive actuator.

More and more vehicle control functions including motion control of a vehicle are implemented by electro-mechanical means.

As one example brake-by-wire is typically used to denote a braking system in which the actuation and transmission devices are decoupled from each other. In a conventional hydraulic brake system, the brake pedal is the actuator and the hydraulic is the transmission device. Here, a distinction is made between the electrohydraulic brake, electro-pneumatic brake (in trucks) and the electric brake. Only the omission of the hydraulic or pneumatic makes the brake a real, so-called "dry" brake-by-wire application, since no fluid technology systems are used here. One reason for wanting to use this technology may be the slowness of currently used media in a brake system. With the help of pure electromechanical solutions, shorter response times may be achieved, which may also be reflected in the achievable braking distances. Another advantage may be a more favorable manufacturability of the brake-by-wire technology, since components in use in hydraulic systems such as a master cylinder, brake booster and an anti-lock component or more generally a brake modulation component are expensive to make, in comparison. Electromechanical solutions further avoid a risk of pollution by brake fluid associated with vehicles having a hydraulic brake system, which is especially a concern at the end of the vehicle life. Furthermore electromechanical solutions facilitate easier vehicle assembly.

An electric vehicle brake typically has an electromechanical actuation device, configured to press a friction brake lining for braking against a brake body that is to a vehicle wheel. The brake body is typically a brake disc or a brake drum. The actuation device typically has an electric motor and a rotation-to-translation conversion gear that converts a rotary driving motion of the electric motor into a translational motion for pressing the friction brake lining against the brake body. Worm gears, such as spindle gears or roller worm drives, are often used as rotation-to-translation conversion gears. It is also possible to convert the rotary motion into a translational motion by means of a pivotable cam, for instance. A step-down gear, for instance in the form of a planetary gear, is often placed between the electric motor and the rotation-to-translation conversion gear. Self-boosting electromechanical vehicle brakes have a self booster that converts a frictional force, exerted by the rotating brake body against the friction brake lining that is pressed for braking against the brake body, into a contact pressure, which presses the friction brake lining against the brake body in addition to a contact pressure that is exerted by the actuation device. Wedge, ramp, and lever mechanisms are suitable for the self boosting.

An electric vehicle brake is controlled by an electronic control unit (ECU) which is responsive to an external brake control signal which is generated in response to a driver action, e.g. pressing a brake pedal, or generated autonomously upon detection of an obstacle by a radar system. More and more vehicle functionalities like braking are electronically controlled. For example, a state of the art premium type car may contain over a hundred electronic control units (ECUs) that each are responsible for a particular function like steering, engine power control, braking, environment monitoring, climate control and the like. Typically various actuators are involved to provide for a proper response to control input from a driver or from an autonomous driving system.

For example in case the control input is a steer intent signal, various actuators may be involved to change the direction of the vehicle. Therewith each front wheel may have a proper steer actuator that controls its orientation. Also the back wheels may have a proper steer actuator for example to appropriately correct their orientation when the vehicle takes a bend, or to facilitate parking. In case the control input is a braking intent signal the vehicle may be decelerated by exerting a braking force on each of the vehicles wheels in a distributed manner. The actual force exerted per wheel is typically greater for the front wheels than for the back wheels. A distribution of the braking force may further depend on a current steering angle. Also, the braking force may be partly or fully realized as regenerative braking wherein the kinetic energy of the vehicle is converted to electric energy to be stored.

Typically respective central ECUs are provided to coordinate respective main vehicle control functions, such as a central ECU for braking control, a central ECU for steering control, a central ECU for engine control and the like. Typically, an ECU with a particular function, e.g. a central ECU does no not operate autonomously, but operates in cooperation with other ECU's. For example an ECU for braking control cooperates with an ECU for steering control and an ECU for engine power control for optimal vehicle stability.

Consequently, an electronic control unit is a crucial element in an electric brake system. For that reason safety standards are defined by ISO 26262-Functional Safety for Road Vehicles standard. The standard specifies is a risk classification scheme denoted as Automotive Safety Integrity Level (ASIL). This is an adaptation of the Safety Integrity Level (SIL) used in IEC 61508 for the automotive industry. This classification helps defining the safety requirements necessary to be in line with the ISO 26262 standard. The ASIL is established by performing a risk analysis of a potential hazard by looking at the Severity, Exposure and Controllability of the vehicle operating scenario. The safety goal for that hazard in turn carries the ASIL requirements. There are four ASILs identified by the standard: ASIL A, ASIL B, ASIL C, ASIL D. ASIL D dictates the highest integrity requirements on the product and ASIL A the lowest. Hazards that are identified as "Quality Management" (QM) do not dictate any safety requirements. Under certain circumstances, the required ASIL classification of components can be lowered through a technique referred to as ASIL Decomposition. For example, a safety function implemented in an integrated device having high ASIL rating may be decomposed into independent sub-functions or components, with possibly lower ASIL. This can be advantageous, for example, with respect to improving system robustness and/or lowering production costs. However, it can be difficult to assure independent operation of the decomposed elements.

There is yet a need for an improved motion control system and automotive actuator control which allows the use of cost-effective redundant circuits while maintaining the highest vehicle safety requirements.

SUMMARY

The inventors find that, from the results of vehicle simulation analyses, the safety and stability of a vehicle can typically be ensured only with a fail operational concept and the use of expensive ASIL D compliant E/E Hardware components. So the use of redundant ASIL B components is typically not feasible without a special concept as this is not compliant to the ASIL D level diagnostic coverage and failure rate (especially to mitigate the random E/E Hw failures).

The electric motion control system described herein, can achieve ASIL D requirements on system level with the use of lower complexity (ASIL B) E/E hardware components.

According to a preferred embodiment, a motion control system for motion control of a vehicle is provided that comprises a central controller and for each wheel of the vehicle, a respective motion control actuator configured to apply motion control to the wheel based on a respective actuator control signal received by the respective motion control actuators from the central controller.

The central controller configured to control the motion of the vehicle by sending the respective actuator control signal to the respective motion control actuator of each wheel based on a motion control intent signal received by the central controller.

The motion control system is configured to determine whether or not the central controller is functional.

At least one of the motion control actuators in the preferred embodiment is configured to apply motion control to its own wheel based directly on the motion control intent signal. In addition it sends respective actuator control signals to other motion control actuators of each other wheel of the vehicle, based on the motion control intent signal. Accordingly, if it is determined that the central controller is not functional, the at least one of the motion control actuators assumes the role of a master controller, therewith acting as a backup for the central controller.

In some examples the at least one of the motion control actuators is configured to perform the determination whether or not the central controller is functional. This is advantageous in that a risk of delay between the determination of the central controller being not functional and the motion control actuator assuming the role of a master controller is mitigated. Such a delay could occur, when the determination is transmitted as a message.

In some embodiments the motion control actuator assuming the role of a master controller is configured to cooperate with one or more functional ECU's of another motion control system, e.g. a motion control actuator assuming the role of master controller may be configured to cooperate with a ECU for steering control and an ECU for engine power control. Therewith it can appropriately respond to the motion control intent signal to apply motion control to its own wheel and to generate the respective actuator control signals to other motion control actuators so as to optimize vehicle stability in the backup operational mode.

In an embodiment, the electric motion control system is configured to provide a warning signal, e.g. an audible or visual warning signal to the driver to indicate that the vehicle should be brought to a garage for repair of the electric motion control system. Additionally or alternatively a warning signal is provided to the responsible garage for enabling the garage to timely urge the car owner to bring the vehicle for repair. Providing a warning signal is therewith an incentive to restrict use of the vehicle and to appropriately adapt driving behavior until repair has taken place. These incentives mitigate the Exposure. Therewith it can be achieved that the motion control system comprising an ASIL-D type central controller and using an ASIL-B or ASIL-C type controller for the at least one of the motion control actuators complies with the ASIL-D requirements In an embodiment entry of the backup operational mode (B) enforces a degraded operational mode of the vehicle. In one example, the electric motion control system enforces a speed limitation to the vehicle in the degraded operational mode, therewith reducing Severity and Controllability. In another example the motion control system is configured to deactivate the vehicle if a predetermined time interval has lapsed or if the vehicle has driven more than a predetermined distance since entry of the backup operational mode, therewith reducing Exposure. In these examples, the vehicle in its degraded operational mode enables the driver to drive the vehicle to a garage for repair of the electric motion control system, but prevents that the driver continues to use the vehicle as if no failure had occurred at all. In some embodiments, one or more of these measures, providing a warning signal to the driver and/or to the garage and enforcing a degraded operational mode of the vehicle by one or more of a speed limitation, and a restriction in driving time and/or distance are combined.

Various options are available for a mode control circuit to determine whether or not the central controller is functional. In one example, the central controller is configured to normally transmit a heartbeat signal, to signal its normal operation. The heartbeat signal is a periodic signal, e.g. having a frequency of 100 Hz or higher. In said one example the mode control circuit monitors the heartbeat signal and maintains the normal operational mode of the electric motion control system as long as it receives the heartbeat signal. If it fails to receive the heartbeat signal it causes the electric motion control system to operate in the backup operational mode.

In another example the mode control circuit is configured to subsequently receive a motion control intent signal and a respective associated actuator control signal from a network. In that example, it is configured to maintain the normal operational mode provided that subsequent to each motion control intent signal it receives an associated actuator control signal from the network within a predetermined time-interval. Once it fails to receive an associated actuator control signal corresponding to a motion control intent signal within the predetermined time-interval it causes the electric motion control system to operate in the backup operational mode.

In some embodiments, the mode control circuit is responsive to an auto-diagnostic signal issued by the central controller. Typically the central controller is provided with auto-diagnostic means that are capable to indicate whether or not the central controller is determined as functional. In an example thereof, the auto-diagnosis by auto-diagnostic means comprises a watchdog procedure between components of the central controller, wherein absence of a response from one of the components indicates that the central controller is to be determined as not-functional. In another example multiple components of the central controller are configured to independently perform a same computation, and the central controller is determined as not-functional if the results of the computations mutually differ.

In one example, the at least one of the motion control actuators is configured to receive the motion control intent signal regardless the selected operational mode of the electric motion control system. However, in the normal operational mode it is responsive to the actuator control signal from the central controller and it ignores the motion control intent signal. Instead, in the backup operational mode it responsive in that it applies motion control to its own wheel based directly on the motion control intent signal, and in that it sends respective actuator control signals to the other motion control actuators of the other wheels of the vehicle, based on the motion control intent signal.

In some embodiments components, e.g. the central controller, motion control actuators, mode control circuit, of the electric motion control system are connected by dedicated signal lines. In a preferred embodiment the components of the electric motion control system are mutually connected by a network. In any case in preferred examples redundant connections, denoted as primary and secondary connections are provided. This guarantees the ability of the components to communicate even if isolated faults occur in the dedicated signal lines or in the network. In examples thereof the at least one motion control actuator is connected to the network via a gateway. In the normal operational mode it passes the actuator control signal transmitted by the central controller to the at least one actuator. In the backup operational mode it passes the motion control intent signal instead.

In an embodiment, the at least one of the motion control actuators is a predetermined one of the motion control actuators. This is advantageous in that only the predetermined one of the motion control actuators needs to have the capability to act as a master controller in case of failure of the central controller.

In an alternative embodiment a plurality of motion control actuators is configured to act as a master controller. This is advantageous in that one or more further backup options are available should it be the case that the central controller fails. In examples thereof a ranking is provided with a first motion control actuator that will be the master controller in case of failure of the central controller, a second motion control actuator that assumes the role of master controller should it be the case that the central controller and the first motion control actuator both fail and so on. In other examples the plurality of motion control actuators that are configured to act as a master perform a negotiation, as in an I2C protocol, to determine which one assumes the role of master controller. This implies that the one with the fastest response will act as the master controller, which is favorable. Different response times may occur if an actuator controller of an individual motion control actuator is busy to perform a task at the moment that it is signaled that the central controller is determined as not functional. Also it may be the case that an individual motion control actuator is capable to determine the central controller as not functional earlier than others and for that reason is also capable to take the initiative to act as the master controller replacing the central controller. In still further examples motion control actuators that are capable to act as a master controller are designated in a rotating manner to act as such, in case of failure of the central controller. A motion control actuator can be individually monitored during its operation as master controller. This provides for an additional way of verifying its functionality.

In an embodiment one or more of the motion control actuators of the electric motion control system that are not capable to act as a master controller are configured to respond to a motion control intent signal that is not succeeded by a corresponding actuator control signal from either the central controller or from a motion control actuator acting as a master controller. In this further backup mode of operation the one or more of the actuators apply motion control to their associated wheel in response to the motion control intent signal, without sending actuator control signals to other motion control actuators. Therewith a motion control action can be performed even if the central controller fails and none of the motion control actuator is capable to act as master controller.

A motion control actuator may be capable to react autonomously to some extent regardless the operational mode. For example an embodiment wherein the motion control system is a brake control system, is provided wherein at least one of the brake actuators has an ABS functionality. Therewith it can adapt a mode of braking applied to its own wheel to avoid a skid of the wheel regardless whether it is responsive to a brake control signal or is responsive to a motion control intent signal.

Also an automotive actuator is provided herein that comprises an actuation mechanism and an actuator controller. The actuation mechanism comprises an actuated device for applying an amount of force or torque, and an electric motor that is operably connected to the actuated device via a transmission. The actuator controller is configured to receive an actuation intent signal and a subsequent actuator control signal from a network, wherein the subsequent actuator control signal is based on the actuation intent signal. The actuator controller comprises a mode control circuit that is configured to select an operational mode of the actuator controller from at least one of a normal operational mode and backup operational mode. The actuator controller also comprises a main circuit that is configured to provide a power signal to the electric motor based on a received signal. In the normal operational mode, the main circuit is configured to provide the power signal based on a received actuator control signal. Instead, in the backup operational mode the main circuit is configured to provide the power signal based on a received actuation intent signal. Additionally, in the backup operational mode, the main circuit is further configured to send at least one backup actuator control signal based on the received actuation intent signal for controlling another automotive actuator.

In some examples the automotive actuator is configured to receive an input mode control signal in response to which the mode control circuit selects the operational mode. In some examples the mode control circuit is configured to autonomously select a mode of operation. As an example, the mode control circuit is configured to maintain the normal operational mode provided that subsequent to each actuation intent signal it receives an associated actuator control signal from the network within a predetermined time-interval. Once it fails to receive an associated actuator control signal corresponding to an actuation intent signal within the predetermined time-interval it selects the backup operational mode.

In a further example the mode control circuit is configured to monitor a heartbeat signal of a central controller and to maintain the normal operational mode as long as it receives the heartbeat signal. If it fails to receive the heartbeat signal it selects the backup operational mode. In again other examples, the mode control circuit of the automotive actuator is configured both to select the operational mode in response to an external mode control signal and to autonomously select an operational mode. In one of these examples the mode control circuit of the automotive actuator is configured to maintain the normal operational mode as long as the external mode control signal does not indicate that the backup operational mode is to be selected and the mode control circuit itself did not detect a failure of a central controller. It selects the backup operational mode in case that either the external mode control signal indicates that the backup operational mode is to be selected or in case that it detects a failure itself, e.g. from the absence of a heartbeat and/or the absence of a corresponding actuator control signal within a time limit following detection of an actuation intent signal.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 4A shows an overview of the automotive actuator and FIG. 4B shows a component thereof in more detail.

DETAILED DESCRIPTION OF EMBODIMENTS

Figure 1:
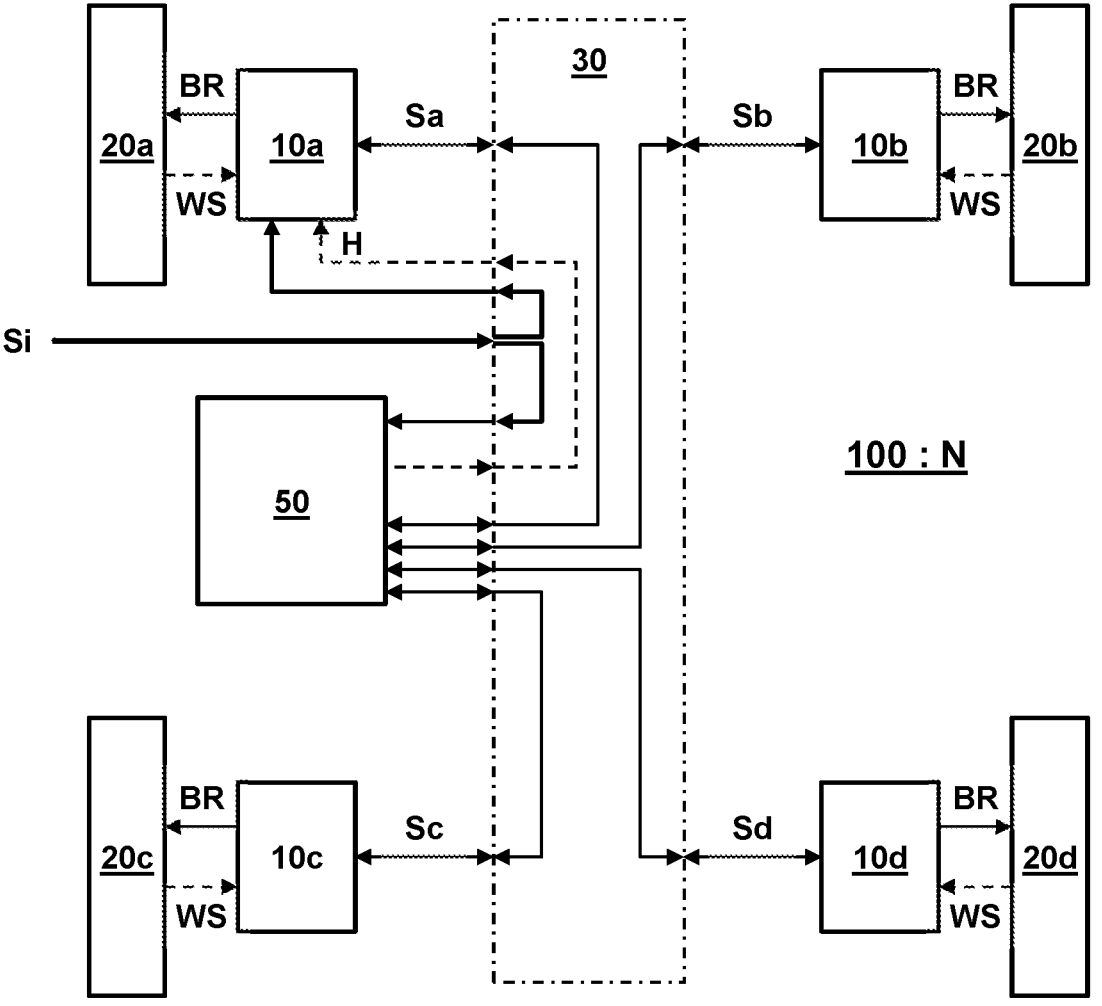
FIG. 1 shows an embodiment of a vehicle motion control system as disclosed herein, in a normal operational mode.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 schematically shows a vehicle motion control system 100 for controlling motion of a vehicle.

The motion control system comprises for each wheel 20a,20b,20c,20d of the vehicle, a respective motion control actuator 10a,10b,10c,10d configured to control a motion of the wheel based on a respective actuator control signal Sa,Sb,Sc,Sd received by the respective motion control actuators.

The motion control system further comprises a central controller 50 that is configured to control the motion of the vehicle by sending the respective actuator control signal Sa to the respective motion control actuator 10a,10b,10c,10d of each wheel 20a,20b,20c,20d based on a motion control intent signal Si received by the central controller 50.

The motion control system is configured to determine whether or not the central controller is functional. In one example the motion control system comprises a dedicated diagnostic module to perform this determination.

At least one of the motion control actuators 10a is configured to control a motion of its own wheel 20a based directly on the motion control intent signal Si if it is determined that the central controller 50 is not functional. In addition, it is configured to send respective actuator control signals Sb,Sc,Sd to other motion control actuators 10b,10c, 10d of each other wheels 20b,20c,20d of the vehicle, based on the motion control intent signal Si if it is determined that the central controller 50 is not functional. In one example the at least one of the motion control actuators 10a is configured to perform the determination whether or not the central controller 50 is functional.

In a first embodiment, shown in FIG. 1, the motion control system is configured as a brake system for braking the vehicle, and the respective motion control actuator 10a,10b, 10c,10d is a respective brake actuator that is to apply braking BR to its own wheel 20a to control the motion of its wheel. The central controller 50 provided therein is configured to control the braking BR by coordinating the operation of the brake actuators in accordance with a motion control intent signal that is provided as the motion control intent signal.

In a second embodiment the motion control system is configured as a steering system for steering the vehicle, and the respective motion control actuator 10a,10b,10c,10d is a respective steer actuator that is to control an orientation of its own wheel 20a to control the motion of its wheel. Therewith the steer actuator defines the wheel's rotational angle around an axis orthogonal to a surface of the road to control the moving direction of the vehicle. In some examples the steer actuator also controls an orientation of its wheel according to a slanting angle, i.e. an angle between the rotational axis of the wheel and the road surface. Therewith the steer actuator maintains the rotational axis parallel to the road surface when the vehicle drives straight forward and causes the wheel to slant towards a side of the vehicle in which the vehicle is directed as a result of steering. In some examples separate actuators are provided to control the rotational angle and the slanting angle of the wheel. The central controller 50 is provided therein to coordinate the operation of the steer actuators in accordance with a steering intent signal that is provided as the motion control intent signal.

In a third embodiment the motion control system is configured as a velocity control system for controlling a velocity of the vehicle, and the respective motion control actuator 10a,10b,10c,10d is a respective power actuator that is to apply a torque of its own wheel 20a to control the rotational velocity of its wheel. The central controller 50 is provided therein to coordinate the operation of the power actuators, and the motion control intent signal is an acceleration/deceleration intent signal.

In each of these embodiments, at least one of the motion control actuators is capable to assume the role of master controller as a backup for the central controller if it is determined that the central controller 50 is not functional. For example, a brake actuator in the first embodiment, is capable to control the motion of its wheel by applying braking BR to its wheel based on the braking intent signal that it receives as the motion control intent signal Si. In particular, in its role as a master controller it sends respective actuator control signals Sb,Sc,Sd to other brake actuators 10b,10c,10d of each other wheels 20b,20c,20d of the vehicle, based on the brake intent signal Si.

As another example at least one of the steer actuators in the second embodiment, is capable to control the motion of its wheel by controlling an orientation of its wheel based on the steering intent signal that it receives as the motion control intent signal Si. In particular, in its role as a master controller it sends respective actuator control signals Sb,Sc, Sd to other steer actuators 10b,10c,10d of each other wheels 20b,20c,20d of the vehicle, based on the steering intent signal Si.

As a further example, a power actuator in the third embodiment, is capable to control the motion of its wheel by applying a torque to its own wheel 20a to control the rotational velocity of its wheel based on the acceleration/deceleration intent signal that it receives as the motion control intent signal Si. In particular, in its role as a master controller it sends respective actuator control signals Sb, Sc, Sd to other power actuators 10b,10c,10d of each other wheels 20b,20c,20d of the vehicle, based on the acceleration/deceleration intent signal Si.

As a further example, a vehicle may be equipped with two or more motion control systems.

An embodiment wherein the electric motion control system 100 is an electric brake system is now described in more detail with reference to FIGS. 1 and 2. Therein FIG. 1 and FIG. 2 show the electric brake system in a normal operational mode N and in a backup operational mode B respectively.

The electric brake system 100 shown in FIG. 1 comprises for each wheel 20a,20b,20c,20d a respective brake actuator 10a,10b,10c,10d configured to apply braking BR to the wheel based on a respective actuator control signal Sa,Sb, Sc,Sd received by the respective brake actuators. The brake system 100 also comprise a central controller 50 that is configured to control the braking BR of the vehicle by sending the respective actuator control signals to the respective brake actuator 10a,10b,10c,10d of each wheel 20a,20b, 20c,20d based on a brake intent signal Si received by the central controller 50. In the embodiment shown, a network 30, e.g. CAN or Ethernet is provided to transmit the actuator control signals. In an alternative embodiment respective signal transmission lines are provided for this purpose. The electric brake control system is configured to determine whether or not the central controller 50 is functional to send the actuator control signals. In one example a separate diagnostic module is provided that performs this determination. In the embodiment shown, at least one of the brake actuators, in this example the brake actuator 10a is configured to determine whether or not the central controller 50 is functional to send the actuator control signals. In some examples a separate diagnostic module as well as at least one brake actuator are configured to perform the determination. In an example thereof, it is determined that the central controller 50 is not functional to send the actuator control signals if at least one of the separate diagnostic module and a brake actuator determine that the central controller 50 is not functional.

Figure 2:
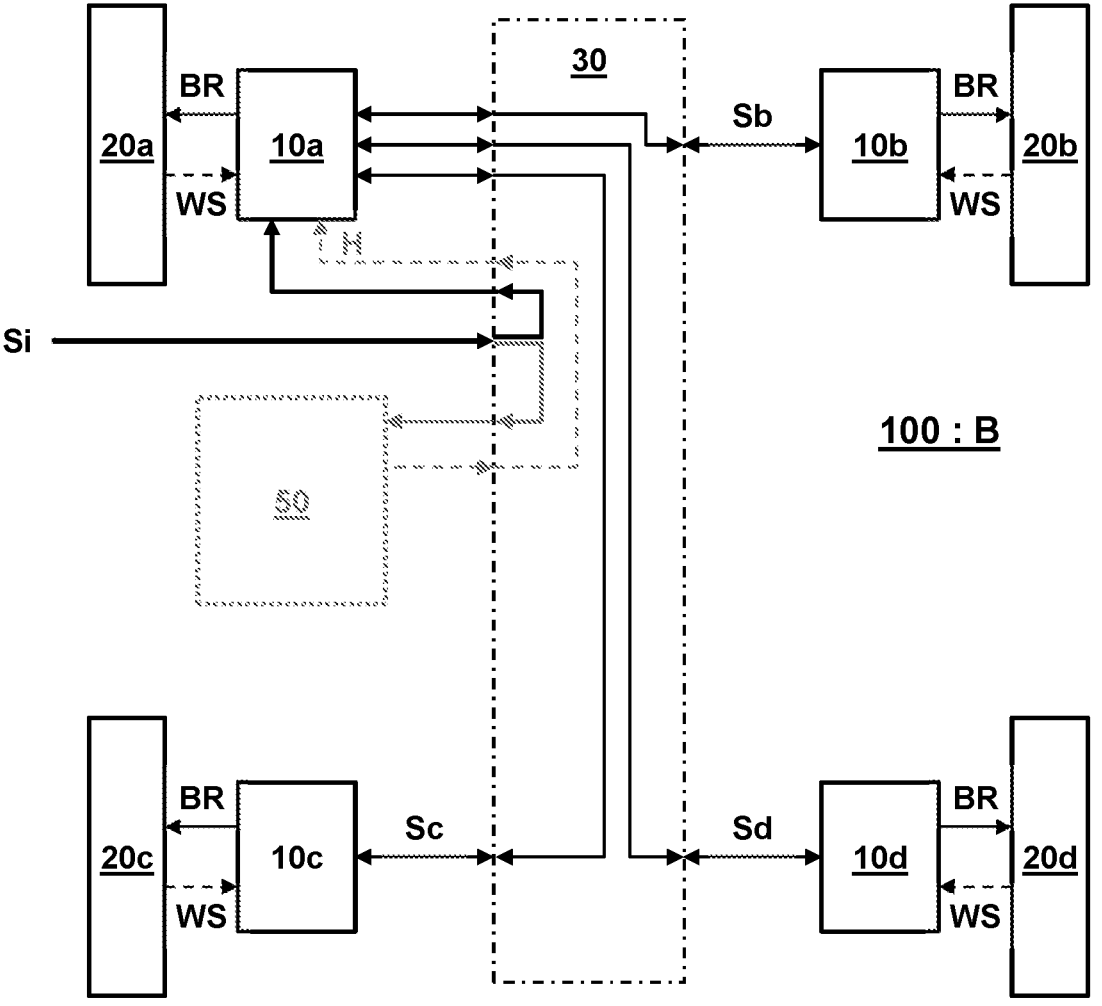
FIG. 2 shows said embodiment of a vehicle motion control system as disclosed herein, in a backup operational mode.

Upon determining that the central controller 50 is not functional, regardless the entity that has made this determination, the at least one brake actuator 10a assumes a role as master controller, as is further illustrated in FIG. 2.

As shown in FIG. 2, in the backup operational mode B, the brake actuator 10a is configured to apply braking BR to its own wheel 20a based directly on the brake intent signal Si instead of acting in response to an actuator control signal Sa. In particular, in its role as a master controller in the backup operational mode B, the brake actuator 10a is configured to send respective actuator control signals Sb,Sc, Sd to other brake actuators 10b,10c,10d of each other wheels (20b,20c,20d) of the vehicle, based on the brake intent signal Si.

In the example shown in FIGS. 1 and 2, the central controller 50 and the brake actuators 10a, 10b, 10c, 10d are communicatively connected via a network 30. Therein the various signals, such as the brake intent signal Si and the actuator control signal Sa are broadcasted. In particular the brake actuator 10a capable to assume the role of a master controller is configured to receive the brake intent signal Si regardless whether or not the central controller 50 is determined as functional. However, in the normal operational mode N shown in FIG. 1, if the central controller 50 is determined as functional, the brake actuators 10a is configured to apply braking BR to its own wheel 20a in response to the actuator control signal Sa and it does not respond to the brake intent signal Si. Also it does not itself send actuator control signals. However, in the backup operational mode shown in FIG. 2, which is assumed after determining the central controller 50 as not functional, the brake actuator 10a is configured to apply braking BR to its own wheel 20a and to send respective actuator control signals Sb,Sc,Sd to other brake actuators 10b,10c,10d based directly on the brake intent signal Si. Should the central controller 50 in the backup operational mode still send actuator control signals Sa the brake actuator 10a will ignore these.

In preferred embodiments the network 30 is provided in a redundant form, to guarantee an availability of the network functionality in case of an isolated failure of a network link. As an example the network is provided with a ring topology.

In the example shown in FIGS. 1,2, it is presumed that only one of the brake actuators, i.e. the brake actuator 10a is configured to act as the master controller. Therewith it is also predefined that the brake actuator 10a is to act as the master controller if the central controller 50 is determined as not functioning.

In other embodiments, the brake system comprises a plurality of brake actuators that each are capable to act as a master controller if the central controller 50 is determined as not functioning. In some examples the brake actuators BA that are capable to act as a master controller are designated in a rotating manner to act as such. In one example thereof the brake actuator 10a that is currently designated as the potential master controller assumes that role should at that point in time the central controller 50 be determined as not functioning. In one variation of that example the designated brake actuator 10a remains the master controller. In another variation subsequently other brake actuators BA are designated to assume that role in a rotating manner. In a further example a predetermined one of the brake actuators BA assumes the role of a master controller upon determining the central controller 50 as not functioning, and subsequently the role of master controller is assigned in a rotating manner. In some variations of this example the predetermined one of the brake actuators is configured to perform the determination whether or not the central controller 50 is functioning. In a variation thereof the predetermined one of the brake actuators BA has additional tasks that it performs upon its initial designation as the master controller, such as providing for a warning signal and/or changing a mode of operation of other vehicle control systems.

In a still further embodiment selection of a brake actuator 10a as the master controller from a plurality of brake actuator 10a takes place in an autonomous manner. In some examples thereof the plurality of brake actuators BA are configured to each determine whether or not the central controller 50 is functioning. The first one that actually performs the determination that the central controller 50 is not functioning assumes the role of master controller.

Figure 3:
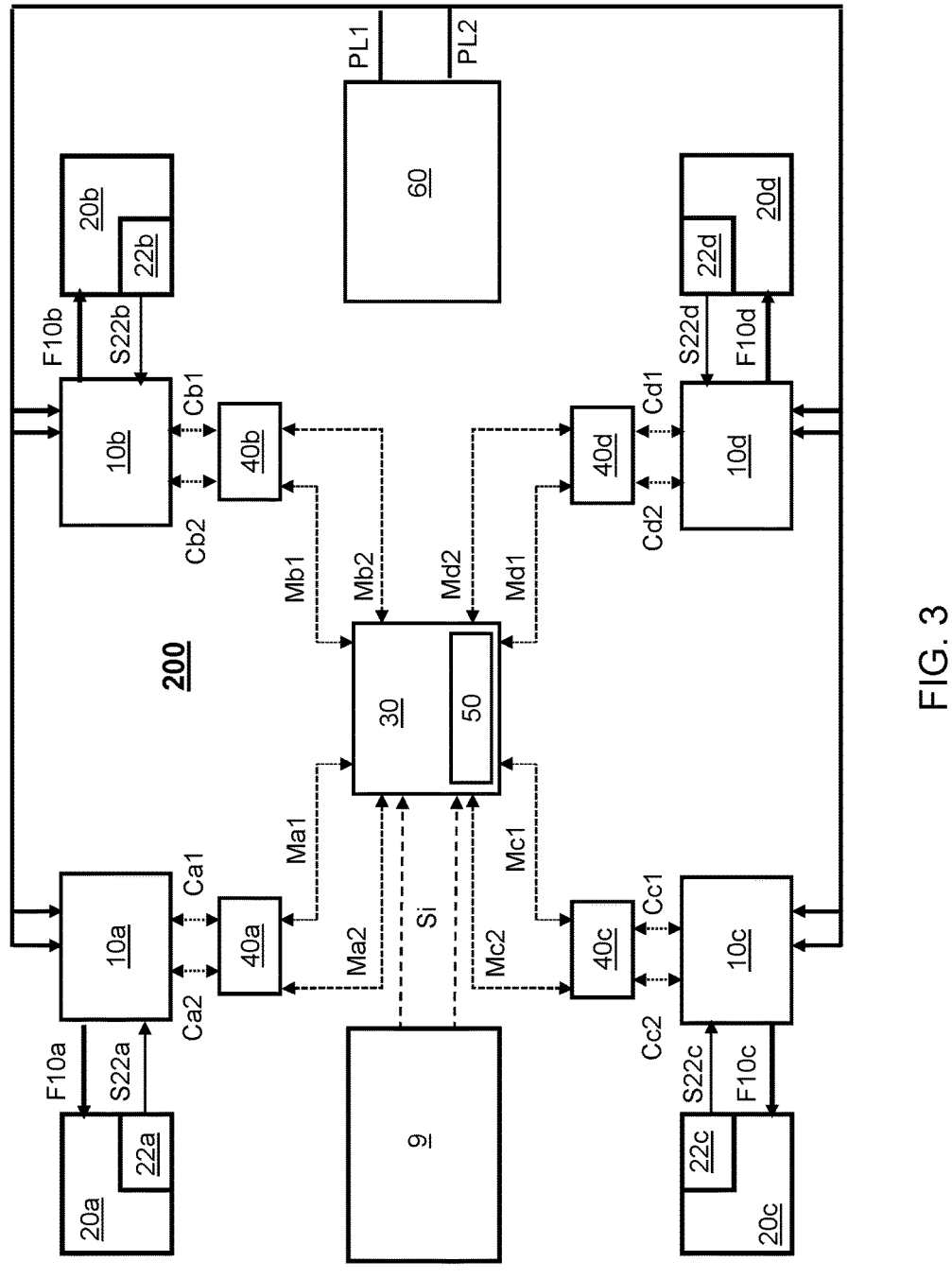
FIG. 3 shows another embodiment of a vehicle motion control system as disclosed herein.

FIG. 3 shows a further embodiment of an electric brake system 200. Parts therein corresponding to those in FIGS. 1 and 2 have a same reference. In the embodiment of FIG. 3, the brake actuators 10a, 10b, 10c, 10d are connected to the network 30 via one or more gateways 40a, 40b, 40c, 40d. The network 30 is configured for signal multicasting and the one or more gateways 40a, 40b, 40c, 40d selective pass the multicasted signals. During a normal operational mode, i.e. the central controller 50 is determined as functioning, the one or more gateways 40a, 40b, 40c, 40d selectively pass the actuator control signal Sa from the central controller 50 to their associated brake actuator 10a. Upon determining the central controller 50 as not functioning, the backup operational mode B is assumed wherein a gateway selectively passes the brake intent signal Si to the at least one brake actuator 10a. In the example shown, the gateways 40a, 40b, 40c, 40d are mutually interconnected and connected to the central controller 50 by primary and secondary Ethernet connections Ma1, Ma2, Mb1, Mb2, Mc1, Mc2 and Md1, Md2. The gateways 40a, 40b, 40c, 40d also have a CAN protocol interface provided with primary and secondary connections Ca1, Ca2, Cb1, Cb2, Cc1, Cc2 and Cd1, Cd2 for communication with the brake actuators 10a, 10b, 10c, 10d.

Furthermore, network interconnections are provided with a motion control management system 9 that provides motion control intent signals, here brake intent signals Si. In some examples, the motion control management system 9 is fully autonomous. In other examples the motion control management system is partly or fully controlled by a driver. In the example shown the brake actuators 10a, 10b, 10c, 10d are configured to apply braking force F10a, F10b, F10c, F10d to their own wheel 20a, 20b, 20c, 20d respectively. Each wheel has a respective wheel speed sensor 22a, 22b, 22c, 22d to provide as respective wheel speed indication S22a, S22b, S22c, S22d. In a variation of this example, the brake actuators 10a, 10b, 10c, 10d are provided with an ABS functionality enabling it to adapt a mode of braking BR applied to its own wheel to avoid a skid of the wheel regardless whether it is responsive to a brake control signal Sa or is responsive to a brake intent signal Si. In other examples, alternatively or additionally, the respective wheel speed indication S22a, S22b, S22c, S22d are transmitted via the gateways 40a, 40b, 40c, 40d to the central controller 50.

FIG. 3 further shows a power supply 60 with redundant power lines PL1, PL2 to supply power to the components of the electric brake system 200.

Preferably, the central controller 50 is classified as ASIL-D. For example, the central controller 50 comprises a dual core lockstep processor. Typically, the units and modules as described herein with reference to the central controller 50 can be implemented in hardware and/or software components. While the functions are depicted as separate blocks, these blocks or functions can also be integrated, further subdivided, or omitted (e.g. because their respective function is not strictly necessary). Also other variation will be apparent to the skilled person having the benefit of the present teachings.

Figure 4A:
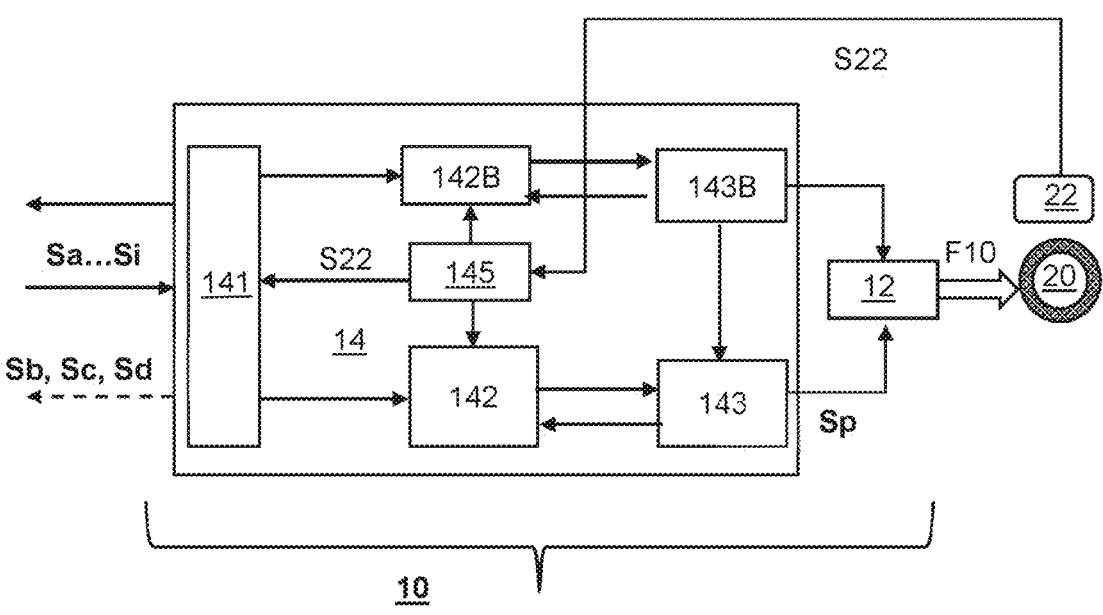
FIG. 4A, 4B show an example of an automotive actuator for use in the vehicle motion control system; Therein
Figure 4B:
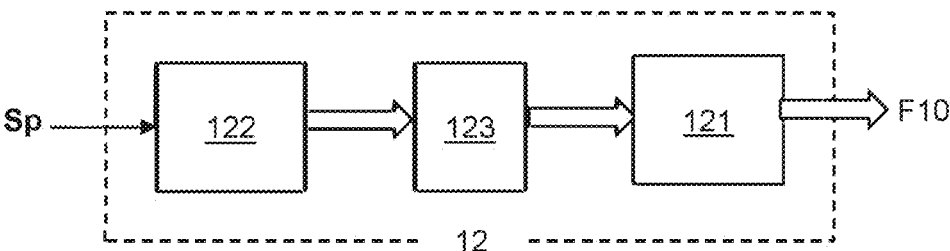

FIG. 4A. 4B shows an example of an automotive actuator 10 that comprises an actuation mechanism 12 an actuator controller 14. As shown in more detail in FIG. 4B, the actuation mechanism 12 comprises an actuated device 121 for applying an amount of force or torque F10, and an electric motor 122 operably connected to the actuated device 121 via a transmission 123.

In an example of an embodiment wherein the automotive actuator 10 is a brake actuator, the actuated device 121 is a friction brake lining for braking against a brake body at the vehicle wheel 20. The brake body is typically a brake disc or a brake drum. The actuation mechanism 12 typically has an electric motor 122 and a transmission 123 in the form of a rotation-to-translation conversion gear that converts a rotary driving motion of the electric motor 122 into a translational motion for pressing the friction brake lining 121 against the brake body. Worm gears, such as spindle gears or roller worm drives, are often used as rotation-to-translation conversion gears. It is also possible to convert the rotary motion into a translational motion by means of a pivotable cam, for instance. A step-down gear, for instance in the form of a planetary gear, is often placed between the electric motor 122 and the rotation-to-translation conversion gear. Self-boosting electromechanical vehicle brakes have a self booster that converts a frictional force, exerted by the rotating brake body against the friction brake lining 121 that is pressed for braking against the brake body, into a contact pressure, which presses the friction brake lining against the brake body in addition to a contact pressure that is exerted by the actuation device. Wedge, ramp, and lever mechanisms are suitable for the self boosting.

The actuator controller 14 comprises a mode control circuit 141 that is configured to select an operational mode of the actuator controller 14 from at least one of a normal operational mode and backup operational mode and a main circuit 142, 143 that is configured to provide a power signal Sp to the electric motor 122 based on a received signal.

The actuator controller 14 is configured to receive an actuation intent signal Si and an actuator control signal Sa from a network, which in normal circumstances succeeds the actuation intent signal Si within a short time interval. In the normal operational mode, the main circuit 142, 143 is configured to provide a power signal Sp to the electric motor 122 based on the actuator control signal Sa.

However, if the mode control circuit 141 selects the backup operational mode B the main circuit 142 is configured to provide the power signal Sp based on a received actuation intent signal Si instead. In particular, in the backup operational mode B the automotive actuator 10 assume the role of a master controller, wherein the main circuit 142 is further configured to send at least one backup actuator control signal Sb, Sc, Sd based on the received actuation intent signal Si for controlling another automotive actuator.

The mode control circuit 141 is configured to select the backup operational mode B if it determines that a central controller 50 that normally provides the actuator control signal Sa is not functional. In one example it is configured to monitor a heartbeat of the central controller 50 and to determine the central controller 50 as not functional when the heartbeat is absent. In another example it is responsive to an external mode control signal. In again another example it monitors a delay or timeout between the moment of receiving an actuation intent signal Si and a corresponding actuator control signal Sa and it selects the backup operational mode B if the corresponding actuator control signal Sa is not received within a predetermined time limit.

In one example the actuation intent signal Si and the actuator control signal Sa are transmitted as a labeled message, wherein the label of the actuator control signal Sa indicates the correspondence with a particular actuation intent signal Si. In another example a timing convention is used wherein it is required that a time-interval Tia between an actuation intent signal Si the corresponding actuator control signal Sa is shorter than a time interval Taa between mutually subsequent actuation intent signals Si.

In the embodiment shown in FIG. 4A, the main circuit comprises a main actuator driver 143 that actually provides the power signal Sp to the motor 122 and a main actuator driver control unit 142 that controls the main actuator driver 143. Also a backup actuator driver control unit 142B and a backup actuator driver 143B are provided as a backup for the main components in case of failure of the latter. An ABS unit 145 is responsive to a wheel speed signal S22 from wheel speed sensor 22. Where necessary it provides control signals to the actuator driver control unit 142 or to the backup actuator driver control unit 142B to provide for an appropriately modulation of the force F10 to avoid that the wheel 20 blocks. The wheel speed signal S22 is also transmitted to the network for use by the central controller 50 during normal operation.

In an alternative embodiment the actuator 10 is capable to autonomously respond to the actuation intent signal Si in case it determines the central controller 50 as not functional, but it is not configured to send backup actuator control signal Sb, Sc, Sd. In an exemplary vehicle motion control system 100, as shown in FIG. 1, 2 and or vehicle motion control system 200 shown in FIG. 3 one of the actuators, e.g. 10a is provided as the actuator shown in FIG. 4A, 4B and the remaining actuators, 10b, 10c, and 10d are provided in accordance with this alternative embodiment. In that case the vehicle motion control system 100 or 200 has a secondary backup operational mode. In the normal operational mode, all automotive actuators 10a, 10b, 10c, 10d are responsive to their respective actuator control signal Sa, Sb, Sc, Sd transmitted by the central controller 50. If the central controller 50 is determined as non functional, then the backup operational mode B is assumed wherein the automotive actuator 10a is designated as the master controller. Should a failure occur in the automotive actuator 10a, then the a secondary backup operational mode is assumed wherein the other automotive actuator 10 autonomously respond to the motion control intent signal Si.

As an example, the vehicle motion control system according to present teachings is illustrated herein in the embodiment of a brake control system. It will be clear to the skilled reader that various other embodiments are conceivable. In another embodiment for example, the motion control system is configured as a steering system for steering the vehicle, and the respective motion control actuator is a respective steer actuator that is to control an orientation of its own wheel to control the motion of its wheel. As a further example the motion control system is configured as a velocity control system for controlling a velocity of the vehicle, and the respective motion control actuator is a respective power actuator that is to apply a torque of its own wheel to control the rotational velocity of its wheel. The central controller is provided therein to coordinate the operation of the power actuators, and the motion control intent signal is an acceleration/deceleration intent signal. In each of these embodiments, at least one of the motion control actuators is capable to assume the role of master controller as a backup for the central controller if it is determined that the central controller 50 is not functional.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

LIST OF REFERENCE SIGNS

B: Backup Operational Mode
N: Normal Operational Mode
BR: Braking Force
F10: Force or Torque exerted by an actuator
Ca1, Cb1, Ce1, Cd1: Primary CAN Connections
Ca2, Cb2, Cc2, Cd2: Secondary CAN Connections
Ma1, Mb1, Mc1, Md1: Primary Ethernet Connections
Ma2, Mb2, Mc2, Md2: Secondary Ethernet Connections
PL1, PL2: Power Supply Lines
Si: Motion Control Intent Signal
Sa, Sb, Sc, Sd: Actuator Control Signal
Sp: Power Signal
S22, S22a, S22b, S22c, S22d: Wheel Speed Signal
9: Motion Control Management System
10: Automotive Actuator
10a, 10b, 10c, 10d: Specific Actuators
12: Actuation Mechanism
14: Actuator Controller
20: Wheel
20a, 20b, 20c, 20d: Specific Wheels
22: Wheel Speed Sensor
30: Network
40a, 40b, 40c, 40d: Gateways
50: Central Controller
60: Power Supply
100: Vehicle Motion Control System (Embodiment 1)
121: Actuated Device
122: Electric Motor
123: Transmission
141: Mode Control Circuit
142, 142B: Main, Backup Actuator Driver Control Circuit
143, 143B: Main, Backup Actuator Driver Circuit
145: ABS Unit
200: Vehicle Motion Control System (Embodiment II)

The invention claimed is:

1. A vehicle motion control system for controlling motion of a vehicle, the motion control system comprising:
   for each wheel of the vehicle, a respective motion control actuator, wherein each motion control actuator is an integrated unit comprising an actuator controller and an actuation mechanism, that is configured to control a motion of the wheel based on a respective actuator control signal received by the respective motion control actuators; and
   a central controller configured to control the motion of the vehicle by sending the respective actuator control signal to the respective motion control actuator of each wheel based on a motion control intent signal received by the central controller;

wherein the vehicle motion control system is configured to determine whether the central controller is functional to send the actuator control signals, and if it is determined that the central controller is not functional, the actuator controller of at least one of the motion control actuators is configured to:

control a motion of its own wheel based directly on the motion control intent signal, and send respective actuator control signals directly to the actuator controllers of other motion control actuators of each other wheels of the vehicle based on the motion control intent signal.

2. The vehicle motion control system according to claim 1, wherein the central controller is configured to normally transmit a heartbeat signal to signal its normal operation, and wherein the central controller is determined as not functional if the heartbeat signal is absent.

3. The vehicle motion control system according to claim 1, wherein the central controller is determined as not functional based on a timeout between a moment of receiving the motion control intent signal and not receiving a corresponding actuator control signal from the central controller.

4. The vehicle motion control system according to claim 1, wherein the brake actuators and the central controller are communicatively connected via a network.

5. The vehicle motion control system according to claim 4, wherein the network comprises primary and secondary connections, and wherein the secondary connections provide a backup route for signals between each of the motion control actuator in case a route for the signals via the primary connections is unavailable.

6. The vehicle motion control system according to claim 1, wherein the at least one of the motion control actuators is configured to receive the motion control intent signal regardless whether or not the central controller is determined as functional, wherein the at least one of the motion control actuators is configured to ignore the motion control intent signal and to apply motion control to its own wheel in response to the actuator control signal if the central controller is determined as functional, and wherein the at least one of the motion control actuators is configured to apply motion control to its own wheel and to send respective actuator control signals to other motion control actuators based directly on the motion control intent signal if the central controller is determined as non-functional.

7. The vehicle motion control system according to claim 1, wherein the motion control actuators are connected to the network via one or more gateways, wherein the network is configured for signal multicasting, wherein the one or more gateways selectively pass the multicast signals, and wherein the one or more gateways selectively pass the motion control intent signal to the at least one motion control actuator if the central controller is determined as not functioning.

8. The vehicle motion control system according to claim 1, wherein the at least one motion control actuator is predefined to act as a master controller if the central controller is determined as not functioning.

9. The vehicle motion control system according to claim 1, wherein the at least one motion control actuator is one of a plurality of motion control actuators, each being capable to act as a master controller if the central controller is determined as not functioning.

10. The vehicle motion control system according to claim 1, wherein brake actuators that are capable to act as a master controller are designated in a rotating manner to act as such.

11. The vehicle motion control system according to claim 1 comprising one or more motion control actuators that are not capable or not enabled to act as a master controller and that are configured to respond to a motion control intent signal that is not timely succeeded by a corresponding actuator control signal from either the central controller or from a motion control actuator acting as a master controller.

12. The vehicle motion control system according to claim 1 being configured to upon determining the central controller as not functional, to provide a human perceivable indication and/or to enforce a degraded operational mode of the vehicle.

13. The motion control system according to claim 1, configured as a brake system for braking the vehicle, wherein the respective motion control actuator is a respective brake actuator that is to apply braking to its own wheel to control the motion of said wheel, wherein the central controller is configured to control the braking, and wherein the motion control intent signal is a brake intent signal.

14. The motion control system according to claim 1, wherein at least one brake actuator is provided with an ABS functionality enabling it to adapt a mode of braking applied to its own wheel to avoid blocking of the wheel regardless whether it is responsive to a brake control signal or is responsive to a brake intent signal.

15. The vehicle motion control system of claim 1, wherein the motion control intent signal is available to a plurality of the motion control actuators, such that upon failure of the at least one motion control actuator acting as the master controller, another of the plurality of motion control actuators is configured to assume the role of master controller.

16. An integrated automotive actuator comprising
an actuation mechanism comprising:
an actuated device for applying an amount of force or torque, and
an electric motor operably connected to the actuated device via a transmission; and
an actuator controller configured to receive an actuation intent signal and a subsequent actuator control signal from a network, wherein the subsequent actuator control signal is based on the actuation intent signal, the actuator controller comprising:
a mode control circuit configured to select an operational mode of the actuator controller from at least one of a normal operational mode and backup operational mode,
a main circuit configured to provide a power signal to the electric motor based on a received signal,
wherein in the normal operational mode, the main circuit is configured to provide the power signal based on a received actuator control signal, and
wherein in the backup operational mode the main circuit is configured to provide the power signal based on a received actuation intent signal,
wherein in the backup operational mode, the main circuit is further configured to send at least one backup actuator control signal based on the received actuation intent signal directly to another actuator controller of another automotive actuator for controlling said another automotive actuator.

17. The integrated automotive actuator according to claim 16, wherein the mode control circuit is configured to select the backup operational mode if it does not detect a heartbeat signal from a central controller.

18. The integrated automotive actuator according to claim 16, wherein the mode control circuit is configured to select the backup operational mode based on a timeout between a moment of receiving the motion control intent signal and not receiving the subsequent actuator control signal.

19. The integrated automotive actuator according to claim 16, configured as a brake actuator that is to apply braking to its own wheel to control the motion of said wheel, wherein the motion control intent signal is a brake intent signal and wherein the subsequent actuator control signal is a subsequent brake actuator control signal.

20. The integrated automotive actuator according to claim 19, configured as a brake actuator provided with an ABS functionality enabling it to adapt a mode of braking applied to its own wheel to avoid blocking of the wheel regardless whether it is responsive to a brake control signal or is responsive to a brake intent signal.

\* \* \* \* \*